(12) United States Patent
Jang

(10) Patent No.: US 11,421,588 B2
(45) Date of Patent: Aug. 23, 2022

(54) VARIABLE COMPRESSION RATIO ENGINE

(71) Applicant: Soon Gil Jang, Seoul (KR)

(72) Inventor: Soon Gil Jang, Seoul (KR)

( * ) Notice: Subject to any disclaimer, the term of this patent is extended or adjusted under 35 U.S.C. 154(b) by 0 days.

(21) Appl. No.: 17/219,085

(22) Filed: Mar. 31, 2021

(65) Prior Publication Data

US 2021/0310406 A1    Oct. 7, 2021

(30) Foreign Application Priority Data

Apr. 2, 2020   (KR) ................. 10-2020-0040442
Feb. 6, 2021   (KR) ................. 10-2021-0017152

(51) Int. Cl.
*F02B 75/04*    (2006.01)

(52) U.S. Cl.
CPC ................... *F02B 75/048* (2013.01)

(58) Field of Classification Search
CPC .................................................. F02B 75/048
See application file for complete search history.

(56) References Cited

U.S. PATENT DOCUMENTS

| | | | |
|---|---|---|---|
| 6,644,171 B2 | 11/2003 | Styron et al. | |
| 7,007,638 B2 | 3/2006 | Yamada | |
| 9,611,894 B2 | 4/2017 | Bigot et al. | |
| 10,167,776 B2 | 1/2019 | Meacham | |
| 2008/0017023 A1 | 1/2008 | Rabhi | |
| 2010/0107746 A1* | 5/2010 | Rabhi | F02D 15/02 73/114.16 |
| 2014/0238355 A1 | 8/2014 | Woo et al. | |
| 2018/0163623 A1* | 6/2018 | Sokalski | F02B 75/04 |

FOREIGN PATENT DOCUMENTS

| | | | | |
|---|---|---|---|---|
| DE | 102016214629 A1 | * | 2/2018 | ............. F02B 75/04 |
| GB | 473887 A | * | 10/1937 | ............ F02B 75/045 |
| JP | 3038403 U | | 6/1997 | |
| JP | 2000130201 A | * | 5/2000 | ............ F02B 75/047 |
| JP | 2004124848 A | * | 4/2004 | |
| KR | 10-2001-0012405 A | | 2/2001 | |
| KR | 10-0980863 B1 | | 9/2010 | |
| KR | 10-1028181 B1 | | 4/2011 | |
| KR | 10-1180955 B1 | | 9/2012 | |
| KR | 10-1316881 B1 | | 10/2013 | |
| KR | 10-1518881 B1 | | 5/2015 | |
| KR | 10-1665606 B1 | | 10/2016 | |
| KR | 10-2017-0069601 A | | 6/2017 | |
| KR | 10-1806157 B1 | | 12/2017 | |
| KR | 10-1886078 B1 | | 8/2018 | |
| KR | 10-1896335 B1 | | 9/2018 | |

* cited by examiner

*Primary Examiner* — Kevin A Lathers
(74) *Attorney, Agent, or Firm* — Novick, Kim & Lee, PLLC; Jae Youn Kim

(57) ABSTRACT

A variable compression ratio engine is provided, which includes a connecting rod including a small end connected to a piston through a piston pin, and a big end connected to a crankshaft through a crank pin, a gear eccentric sleeve installed on at least one of the piston pin and the crank pin, and at least one rack engaged with a gear formed on an outer circumferential surface of the gear eccentric sleeve at one side thereof.

5 Claims, 17 Drawing Sheets

VARIABLE COMPRESSION RATIO ENGINE

CROSS-REFERENCE TO RELATED APPLICATIONS

This application claims priority under 35 U.S.C § 119 to Korean Patent Application Nos. 10-2020-0040442 and 10-2021-0017152, filed in the Korean Intellectual Property Office on Apr. 2, 2020 and Feb. 6, 2021, respectively, the entire contents of which are hereby incorporated by reference.

TECHNICAL FIELD

The present disclosure relates to a variable compression ratio engine, and more particularly, to a variable compression ratio engine capable of adjusting and changing the compression ratio as necessary in an internal combustion engine used in automobiles or the like.

BACKGROUND ART

Typically, the compression ratio of a related internal combustion engine is determined at the time of initial design and manufacture. The internal combustion engine is usually used in various environments where changes occur frequently, and several basic methods for changing the compression ratio of the internal combustion engine as necessary are disclosed. In general, for a method of changing the volume in a combustion chamber when a piston is at the top dead center, there are a method of changing space of a cylinder head, and a method of changing the top dead center of the piston. Examples of the method of changing the top dead center of the piston include a method of changing a distance between a crankshaft and a head, a method of changing a length of a crank arm, and a method of changing a length of a connecting loader.

Examples of the method of changing the length of the connecting loader include a method of configuring the connecting rod as a five-bar linkage rather than using one connecting loader between a piston pin and a crank pin. In addition, there are a method of adjusting the height of the rack by connecting the connecting rod connected to the crank pin to a center of a toothed wheel, connecting the connecting rod connected to the piston to one side of the tooth, and engaging the rack on the other side of the tooth, and the like. In addition, as a method of using one connecting loader, there are a method of changing the length of the connecting loader and a method of changing the effective length of the connecting rod by using an eccentric sleeve in which a center of an outer circumference and a center of an inner circumference do not match.

Examples of the method of using the eccentric sleeve include a method of rotating the eccentric sleeve using a hydraulic device, and a method of rotating the eccentric sleeve through a rod connected to the eccentric sleeve and a mechanical device. However, a hydraulic system has difficulties in changing and controlling the angle of the piping and the eccentric sleeve, and rods and mechanical devices connected to the eccentric sleeve have problems related to fast reciprocating motion, strong shock, vibration, noise, increased load, and increased space generated during explosion.

SUMMARY

An object of the present disclosure is to provide a variable compression ratio engine capable of easily changing a compression ratio as needed so that less space is required, vibration and noise are not caused, and the burden on the crank pin and the crankshaft is not increased.

Another object of the present disclosure is to provide a method of simply adjusting the posture of an eccentric sleeve through a variable compression ratio engine capable of easily changing the compression ratio as needed.

According to an embodiment of the present disclosure, a variable compression ratio engine is provided, which may include a connecting rod including a small end connected to a piston through a piston pin, and a big end connected to a crankshaft through a crank pin, a gear eccentric sleeve installed on at least one of the piston pin and the crank pin, and at least one rack engaged with a gear formed on an outer circumferential surface of the gear eccentric sleeve at one side thereof.

According to an embodiment, the variable compression ratio engine may further include a rack extension end protruding from one end of the rack, and at least one block for adjusting a rotation angle of the gear eccentric sleeve by contacting the rack extension end and moving the rack extension end when the rack is moved as the crankshaft is rotated.

According to an embodiment, the variable compression ratio engine may further include a brake pad having one side in contact with one side of the rack, and a spring contacting the other side of the brake pad and applying pressure to the brake pad to control a movement of the rack.

According to an embodiment, the rack may be engaged with a gear of the gear eccentric sleeve in at least one of a vertical direction, a horizontal direction, or an inclined direction with respect to a longitudinal direction of the connecting rod.

According to another embodiment, the variable compression ratio engine may include a connecting rod including a small end connected to a piston through a piston pin, and a big end connected to a crankshaft through a crank pin, a gear eccentric sleeve including a cylindrical eccentric sleeve installed on at least one of the piston pin or the crank pin, and a cylindrical concentric sleeve positioned on both ends or on one end of the eccentric sleeve and including a pinion gear formed on an outer circumferential surface thereof, and at least one rack engaging with a gear formed on the outer circumferential surface of the gear eccentric sleeve.

According to an embodiment, the variable compression ratio engine may further include at least one block installed on one end of the rack and adjusting a rotation angle of the gear eccentric sleeve by contacting the rack and moving the rack when the piston is positioned at a bottom dead center.

According to an embodiment, when the gear eccentric sleeve is installed on the crank pin, a gear of the concentric sleeve positioned on both ends or on one end of the gear eccentric sleeve may be contacted and engaged with two racks, respectively.

According to another embodiment, a variable compression ratio engine may include a connecting rod including a small end connected to a piston through a piston pin, and a big end connected to a crankshaft through a crank pin, a worm wheel eccentric sleeve including a cylindrical eccentric sleeve installed on the small end, and a concentric sleeve positioned on one end or on both ends of the eccentric sleeve and including a worm wheel installed on an outer circumferential surface, and at least one worm engaged with a worm wheel of the concentric sleeve.

According to an embodiment, the variable compression ratio engine may further include a worm shaft having the worm installed on one side, in which the worm shaft may be installed on the piston.

According to an embodiment, the variable compression ratio engine may further include a worm shaft rotation rod connected to the worm shaft in a sliding manner to rotate the worm shaft.

According to an embodiment, through a variable compression ratio engine using a gear eccentric sleeve, a rack and a block, it is possible to change a compression ratio easily and simply by using a method of adjusting a posture of the gear eccentric sleeve.

According to an embodiment, since it is possible to manufacture the variable compression ratio engine simply, the variable compression ratio engine can be used at low cost. In addition, the efficiency and performance of the variable compression ratio engine can be improved, and fuel consumption and emission of pollutants can be reduced.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawing, in which.

DETAILED DESCRIPTION OF THE INVENTION

Figure 1A:
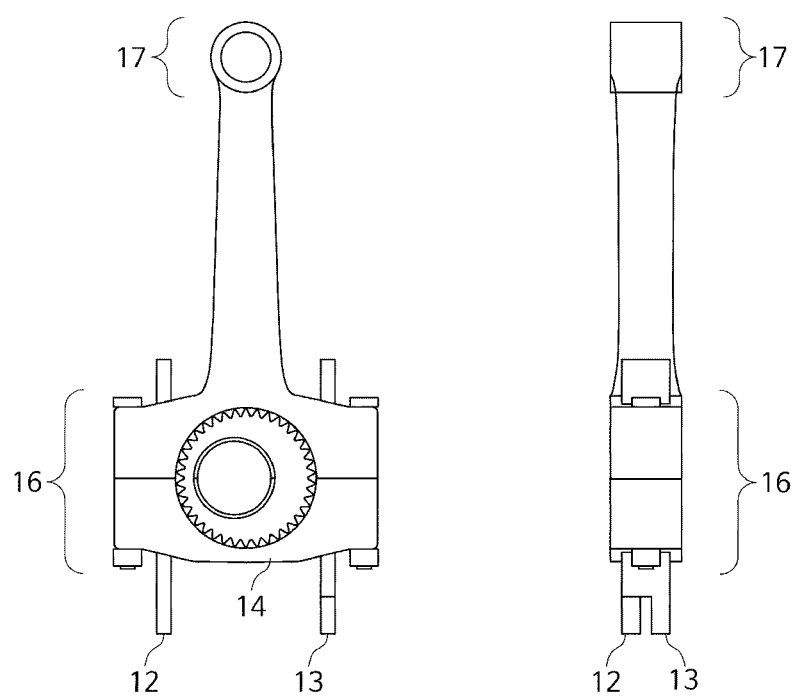
FIG. 1A shows a front view and a side view of a connecting rod installed in a variable compression ratio engine according to an embodiment.

Hereinafter, a configuration of a variable compression ratio engine according to various embodiments of the present disclosure will be described with reference to the accompanying drawings. However, in the following description, detailed descriptions of well-known functions or configurations will be omitted when it may make the subject matter of the present disclosure rather unclear.

In the accompanying drawings, the same or corresponding elements are assigned the same reference numerals. In addition, in the following description of the embodiments, duplicate descriptions of the same or corresponding elements may be omitted. However, even if descriptions of elements are omitted, it is not intended that such elements are not included in any embodiment.

The present disclosure relates to a variable compression ratio engine, and to a structure coupled to a connecting rod that includes a big end connected to a crankshaft through a crank pin, and a small end connected to a piston through a piston pin. The structure coupled to the connecting rod includes an eccentric sleeve installed on the small end or the big end, and a component such as a rack, a worm shaft, and the like which are engaged with the eccentric sleeve and connected thereto to adjust the position, posture, or rotation angle of the eccentric sleeve.

When the eccentric sleeve is installed on the crank pin or the piston pin, the distance between the piston pin and the crank pin may vary according to the posture of the eccentric sleeve even when the same connecting rod is used. The length of the connecting rod that determines the distance between the piston pin and the crank pin is referred to as the "effective length of the connecting rod". When the effective length of the connecting rod is changed, a stroke remains the same, but a top dead center and a bottom dead center of the piston vary, and when the piston is at the top dead center, a volume of a combustion chamber may be changed, resulting in changes in the compression ratio.

An engagement of a rack and a pinion gear may be used to control a posture of the eccentric sleeve. When a method of forming a pinion gear on an eccentric sleeve is used, the pinion gear may be formed on an outer circumferential surface of the eccentric sleeve, or concentric sleeves may be formed at both ends of the eccentric sleeve and then the pinion gear may be formed on the outer circumferential surface of the concentric sleeve. Hereinafter, the eccentric sleeve having the pinion gear formed therein is referred to as a "gear eccentric sleeve". In addition, the distance between the center of the outer circumference (circle connecting the two ends) of the eccentric sleeve and the center of the inner circumference of the eccentric sleeve is referred to as "eccentric distance".

A rack may be used to rotate the gear eccentric sleeve to the required posture. The posture of the gear eccentric sleeve may be determined according to the position of the rack engaged with the pinion gear. The rack may be installed on one of the connecting rod, the crank arm or the piston, and the rack may be moved by an externally installed block. A path for a movement of the rack may be formed according to the rotation of the crankshaft, and a block may be installed on the path for the movement of the rack. According to the position of the block, the corresponding rack is pushed in a certain direction or pushed up. The pushed rack may cause the gear eccentric sleeve to be rotated by a certain extent and change the posture of the gear eccentric sleeve. As a result, the effective length of the connecting rod may be changed to change the top dead center of the piston, thereby changing the compression ratio. When the position of the block is not changed, the position of the rack may not be changed, and the posture of the gear eccentric sleeve may not be changed. Until the position of the block is changed again, the engine may continue to move with the changed compression ratio without external interference.

A worm gear may also be used to control the posture of the eccentric sleeve. A method of forming a worm wheel on the eccentric sleeve involves forming the worm wheel on an outer circumferential surface of the eccentric sleeve, or forming a concentric sleeve on an edge of the eccentric sleeve and then forming the worm wheel on the outer circumferential surface of the concentric sleeve. Hereinafter, the eccentric sleeve having the worm wheel formed thereon is referred to as a "worm wheel eccentric sleeve".

FIG. 1A shows a front view and a side view of a connecting rod 11 installed in a variable compression ratio engine according to an embodiment. As illustrated, the connecting rod 11 may include rack extension ends 12, 13 and a connecting rod cap 14. The connecting rod 11 includes a small end 17 connected to the piston through the piston pin, and a big end 16 connected to the crankshaft through the crank pin. A gear eccentric sleeve 1 may be installed on the big end 16 (or crank pin) of the connecting rod 11 illustrated. The gear eccentric sleeve 1 may have a structure having a pinion gear formed on the outer circumferential surface of the eccentric sleeve. The rack extension ends 12, 13 may be protrusions positioned on a lower end of a rack (not shown) to be engaged with a pinion gear formed on the gear eccentric sleeve 1.

Figure 1B:
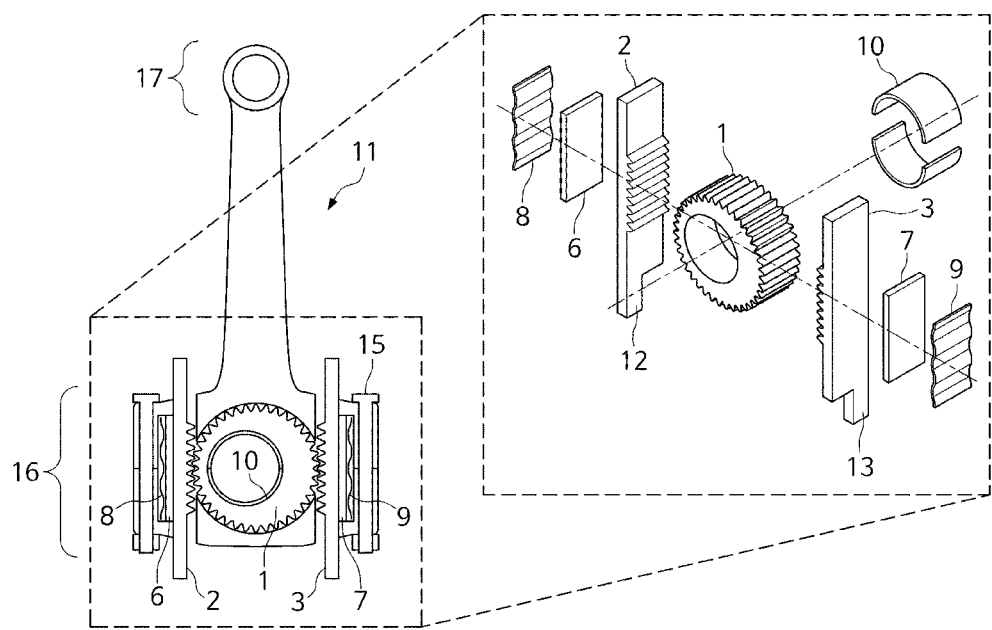
FIG. 1B shows a cross-sectional view and an exploded perspective view of a connecting rod equipped with a gear eccentric sleeve and a rack of a variable compression ratio engine according to an embodiment.

FIG. 1B shows a cross-sectional view and an exploded perspective view of the connecting rod 11 provided with the gear eccentric sleeve 1 and the racks 2, 3 of the variable compression ratio engine according to an embodiment. Referring to FIG. 1B, the gear eccentric sleeve 1 may be installed in a hole in the big end 16 of the connecting rod, and a bearing may be installed inside the gear eccentric sleeve 1. In the big end 16 of the connecting rod 11, the racks 2, 3, brake pads 6, 7, and springs may be sequentially installed on both ends of the gear eccentric sleeve 1, respectively, which are fixed by a rod cap bolt 15. In addition, the brake pads 6, 7 may prevent the racks 2, 3 from moving easily so that the gear eccentric sleeve 1 may not be easily rotated. On the lower ends of the two racks 2, 3, a right rotation rack extension end 12 and a left rotation rack extension end 13 may be elongated.

One side of the brake pads 6, 7 may contact one side of the racks 2, 3, and the springs 8, 9 may contact the other side of the brake pads 6, 7 such that pressure is applied to the brake pads 6, 7, thereby controlling the movement of the racks 2, 3. That is, the brake pads 6, 7 prevent the racks 2, 3 from moving easily with the force of the springs 8, 9 such that the gear eccentric sleeve 1 is not rotated easily and maintained with a stable posture. If the gear eccentric sleeve 1 is rotated easily, it may be gradually rotated due to rotational friction of the crank pin or impact during the explosive stroke, and it may be difficult to stably maintain the posture.

Since the two racks 2, 3 are engaged in one gear eccentric sleeve 1, they may be moved in opposite directions. When the right rotation rack 2 is pushed up, the left rotation rack 3 may be pushed down, and when the left rotation rack 3 is pushed up, the right rotation rack 2 may be pushed down. As a result, in order to cause the gear eccentric sleeve 1 to be rotated by a required angle and keep a posture, one of the installed racks 2, 3 may be pushed up.

Figure 1C:
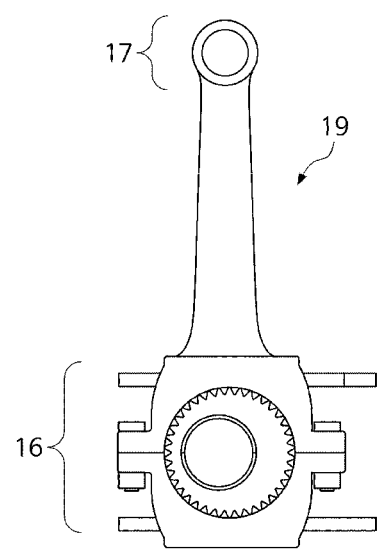
FIG. 1C is a view illustrating a modified example of the rack of the connecting rod installed according to an embodiment.
Figure 1D:
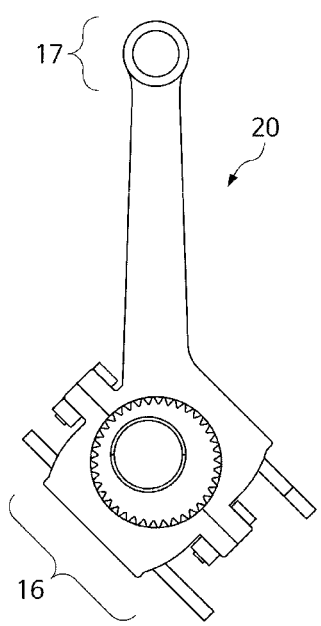
FIG. 1D is a view illustrating another modified example of the rack of the connecting rod installed according to an embodiment.

FIGS. 1C and 1D show views illustrating examples in which the racks 2, 3 of the connecting rods 19, 20 are modified and installed according to an embodiment. As illustrated in FIG. 1C, the big end 16 of the connecting rod 19 may be horizontally-divided type, while as illustrated in FIG. 1B, the big end 16 of the connecting rod 20 may be obliquely-divided type, but the configurations of the connecting rods 19 and 20 are not limited thereto. As illustrated in FIGS. 1C and 1D, the racks 2, 3 may be installed in a vertical, horizontal or inclined direction on both sides of the gear eccentric sleeve 1 through a horizontally-divided big end connecting rod and an obliquely-divided big end connecting rod. That is, the racks 2, 3 may be installed so as to be engaged with the gears of the gear eccentric sleeve 1 in at least one of the vertical direction, the horizontal direction, or the inclined direction with respect to the longitudinal direction of the connecting rods 11, 19, 20.

Referring to FIGS. 1A to 1D, the method of maintaining the gear eccentric sleeve 1 in a stable posture while preventing it from being easily rotated is not limited to the method described above. For example, the hole in the big end 16 of the connecting rod may be made in close contact with the size of the gear eccentric sleeve 1, or the brake pads 6, 7 may be installed inside the hole in the big end 16 of the connecting rod. In addition, like the bearing 10, the gear eccentric sleeve 1 may be fabricated as two divided pieces and then assembled into one to be used.

Figure 2:
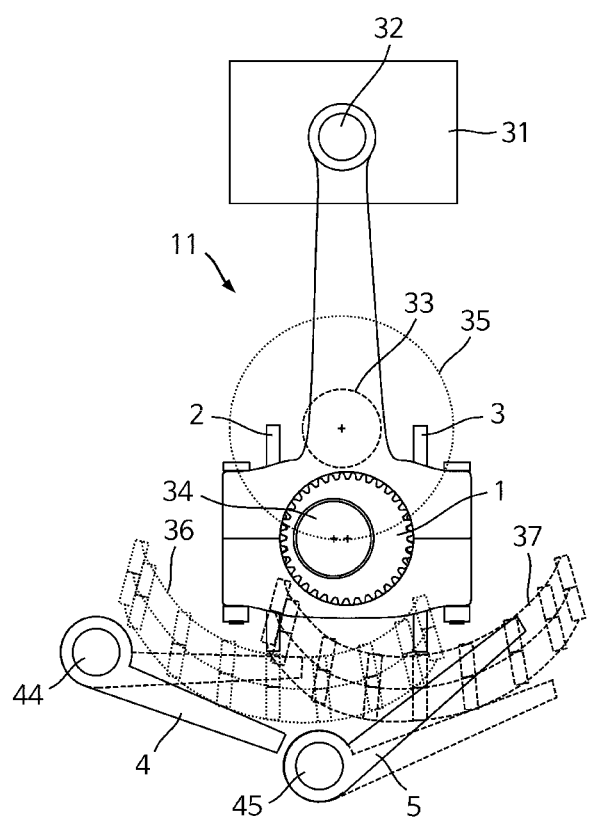
FIG. 2 is a view illustrating paths through which rack extension ends are passed, in a state in which the gear eccentric sleeve and the rack are installed in the vertical direction on a big end of the connecting rod of the variable compression ratio engine according to an embodiment.

FIG. 2 is a view illustrating paths 36, 37 through which the rack extension ends 12, 13 are passed, in a state in which the gear eccentric sleeve 1 and the racks 2, 3 are installed in the vertical direction on the big end of the connecting rod 11 of the variable compression ratio engine according to an embodiment. As illustrated, the small end of the connecting rod 11 is installed in a piston pin 32 arranged inside a piston 31. The connecting rod 11 may include the gear eccentric sleeve 1, the racks 2, 3 and/or blocks 4, 5. According to an embodiment, referring to FIG. 1A, the gear eccentric sleeve 1 may be installed on the big end of the connecting rod 11, and each of the racks 2, 3 may be installed in the vertical direction.

As illustrated, when the crankshaft 33 is rotated to the left, the path 36 through which the right rotation rack extension end 12 is passed and the path 37 through which the left rotation rack extension end 13 is passed may be indicated by dotted lines. When the crankshaft 33 is rotated to the left, the crank pin 34 may be rotated along the crank pin rotation path 35, and the big end of the connecting rod 11 may be also rotated along the crank pin rotation path 35, and the gear eccentric sleeve 1 installed on the big end of the connecting rod 11 and the racks 2 and 3 engaged with the gears of the gear eccentric sleeve 1 may also be moved along the same path. The path 36 through which the right rotation rack extension end 12 is passed as indicated by the three dotted lines may indicate a path through which the right rotation rack extension end 12 is passed when the right rotation rack 2 is up, in the middle, and down, respectively. The path 37 through which the left rotation rack extension end 13 is passed as indicated by the three dotted lines may indicate a path through which the left rotation rack extension end 13 is passed when the left rotation rack 3 is up, in the middle, and down, respectively.

At the lower end of the connecting rod 11, there may be provided the right rotation block 4 and the left rotation block 5. The right rotation block 4 and the left rotation block 5 may push up the right rotation rack extension end 12 and the left rotation rack extension end 13, respectively, in the paths through which the right rotation rack extension end 12 and the left rotation rack extension end 13 are passed. In order to move the two blocks 4, 5, as illustrated, the blocks 4, 5 may be connected to the rotation shafts 44, 45, respectively. In addition, they may be connected to a cam device and used, or may perform a function in various ways, such as being driven by a hydraulic device or an electric screw or the like. Meanwhile, the shape of the blocks 4, 5 is not limited to those shown.

In order to cause the gear eccentric sleeve 1 to be rotated by a required angle and keep a posture, one of the two racks 2, 3 may be pushed up. It is possible to adjust the position of the right rotation block 4 installed on the path 36 through which the right rotation rack extension end 12 is passed and the position of the left rotation block 5 installed on the path 37 through which the left rotation rack extension end 13 is passed. After that, when one of the two racks 2, 3 is pushed up and the other is down, the gear eccentric sleeve 1 may be rotated by a required angle and keep a posture.

Figure 3:
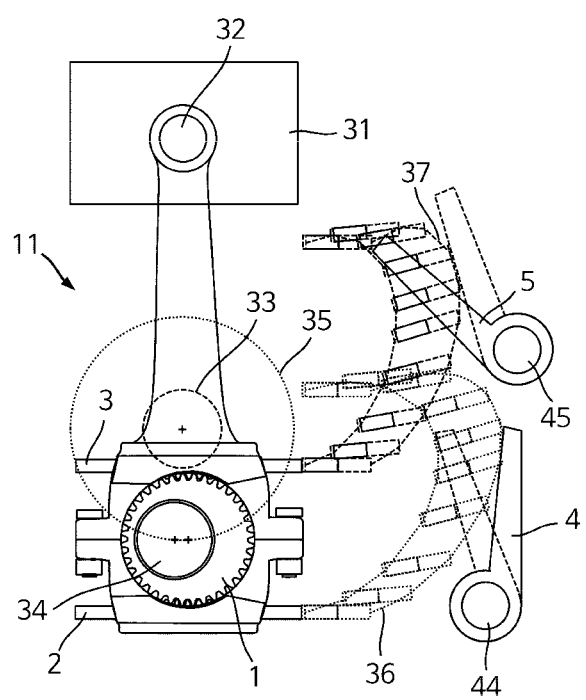
FIG. 3 is a view illustrating paths through which the rack extension ends are passed, in a state in which the gear eccentric sleeve and the rack are installed in the vertical direction on the big end of a horizontally-divided type connecting rod of the variable compression ratio engine according to an embodiment.

FIG. 3 is a view illustrating paths through which the rack extension end is passed, in a state in which the gear eccentric sleeve 1 and the racks 2, 3 are horizontally installed on the big end of the connecting rod 11 of the variable compression ratio engine according to an embodiment. As illustrated, the small end of the connecting rod 11 is installed in a piston pin 32 arranged inside a piston 31. The connecting rod 11 includes the gear eccentric sleeve 1, the racks 2, 3, and the blocks 4, 5. When the gear eccentric sleeve 1 is installed on the big end of the connecting rod 11, the two racks 2, 3 are installed in the horizontal direction, and the crankshaft 33 is rotated to the left, the path 36 through which the right rotation rack extension end 12 is passed and the path 37 through which the left rotation rack extension end 13 is passed may be indicated by dotted lines. When the crankshaft 33 is rotated to the left, the crank pin 34 may be rotated along the crank pin rotation path 35, and the big end of the connecting rod 11 may also be rotated along the crank pin rotation path 35. After that, the gear eccentric sleeve 1 installed on the big end of the connecting rod 11 and the racks 2, 3 engaged with the gears of the gear eccentric sleeve 1 may also be moved along the same path. The path 36 through which the right rotation rack extension end 12 is passed as indicated by the two dotted lines may indicate a path through which the right rotation rack extension end 12 is passed, in the states in which the right rotation rack 2 is pushed to the direction of the small end of the connecting rod 11 and pulled back in the opposite direction. The path 37 through which the left rotation rack extension end 13 is passed as indicated by the two dotted lines may indicate a path through which the left rotation rack extension end 13 is passed, in the states in which the left rotation rack 3 is pushed to the direction of the connecting rod 11 and pulled back in the opposite direction.

According to an embodiment, on the right side of the connecting rod 11, there may be provided the right rotation block 4 and the left rotation block 5. The right rotation block 4 and the left rotation block 5 may push the right rotation rack extension end 12 and the left rotation rack extension end 13 to the left respectively, in the paths 36, 37 through which the right rotation rack extension end 12 and the left rotation rack extension end 13 are passed. In order to move the two blocks 4, 5, as illustrated, the blocks 4, 5 may be connected to the rotation shafts 44, 45, respectively. In addition, they may be connected to a cam device and used, or may perform a function in various ways, such as being driven by a hydraulic device or an electric screw or the like. Meanwhile, the shape of the blocks 4, 5 is not limited to those shown.

In order to cause the gear eccentric sleeve 1 to be rotated by a required angle and keep a posture, one of the two racks 2, 3 may be pushed to the direction of the connecting rod 11. It is possible to adjust the position of the right rotation block 4 installed on the path 36 through which the right rotation rack extension end 12 is passed and the position of the left rotation block 5 installed on the path 37 through which the left rotation rack extension end 13 is passed. After that, when one of the two racks 2, 3 is pushed to the direction of the connecting rod 11, and the other is pulled back in the opposite direction, the gear eccentric sleeve 1 may be rotated by a required angle and keep a posture.

Figure 4:
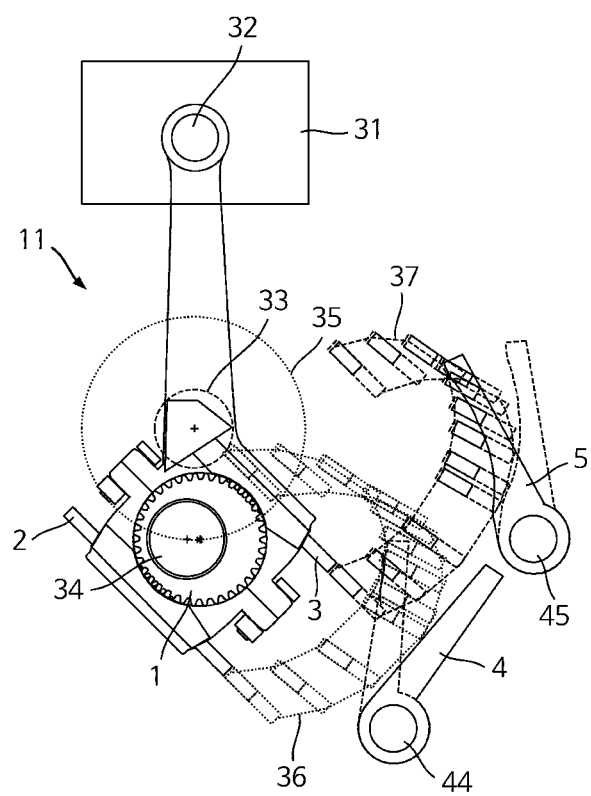
FIG. 4 is a view illustrating paths through which rack extension ends are passed, in a state in which the gear eccentric sleeve and the rack are installed in the inclined direction on the big end of an obliquely-divided type connecting rod of the variable compression ratio engine according to an embodiment.

FIG. 4 is a view illustrating paths through which the rack extension end is passed, in a state in which the gear eccentric sleeve 1 and the racks 2, 3 are installed in an inclined direction on the big end of the connecting rod 11 of the variable compression ratio engine according to an embodiment. As illustrated, the small end of the connecting rod 11 is installed in a piston pin 32 arranged inside a piston 31. The connecting rod 11 may include the gear eccentric sleeve 1, the racks 2, 3 and the blocks 4, 5. According to an embodiment, the gear eccentric sleeve 1 may be installed on the big end of the connecting rod 11, and each of the racks 2, 3 may be installed in the inclined direction.

As illustrated, when the crankshaft 33 is rotated to the left, the crank pin 34 may be rotated along the crank pin rotation path 35, and the big end of the connecting rod 11 may be also rotated along the crank pin rotation path 35, and the gear eccentric sleeve 1 installed on the big end of the connecting rod 11 and the racks 2 and 3 engaged with the gears of the gear eccentric sleeve 1 may also be moved along the same path. When the crankshaft 33 is rotated to the left, the path 36 through which the right rotation rack extension end 12 is passed and the path 37 through which the left rotation rack extension end 13 is passed may be indicated by dotted lines. The path 36 through which the right rotation rack extension end 12 is passed as indicated by the two dotted lines may indicate a path through which the right rotation rack extension end 12 is passed, in the states in which the right rotation rack 2 is raised up to the direction of the small end of the connecting rod 11 and lowered down in the opposite direction. The path 37 through which the left rotation rack extension end 13 is passed as indicated by the two dotted lines may indicate a path through which the left rotation rack extension end 13 is passed, in the states in which the left rotation rack 3 is raised up to the direction of the small end of the connecting rod 11 and lowered down in the opposite direction.

According to an embodiment, to the right side, the right rotation block 4 and the left rotation block 5 may be installed therebeneath. The right rotation block 4 and the left rotation block 5 may push the right rotation rack extension end 12 and the left rotation rack extension end 13 to the left and upward, respectively, in the paths 36, 37 through which the right rotation rack extension end 12 and the left rotation rack extension end 13 are passed. In order to move the two blocks 4, 5, as illustrated, the blocks 4, 5 may be connected to the rotation shafts 44, 45, respectively. In addition, they may be connected to a cam device and used, or may perform a function in various ways, such as being driven by a hydraulic device or an electric screw or the like. Meanwhile, the shape of the blocks 4, 5 is not limited to those shown.

In order to cause the gear eccentric sleeve 1 to be rotated by a required angle and keep a posture, one of the two racks 2, 3 may be pushed up to the left. It is possible to adjust the position of the right rotation block 4 installed on the path 36 through which the right rotation rack extension end 12 is passed and the position of the left rotation block 5 installed on the path 37 through which the left rotation rack extension end 13 is passed. After that, when one of the two racks 2, 3 is pushed up to the left and the other is down to the right, the gear eccentric sleeve 1 may be rotated by a required angle and keep a posture.

Referring to FIGS. 1A to 1D, it is illustrated that the gear eccentric sleeve 1 having the pinion gear formed on the outer circumferential surface of the eccentric sleeve includes the racks 2, 3, the blocks 4, 5, the brake pads 6, 7 and the spring 8, 9 and is installed on the big end of the connecting rod, but embodiments are not limited thereto, and the gear eccentric sleeve 1 may also be installed on the small end of the connecting rod 11, 19, 20. When installed on the small end of the connecting rod 11, 19, 20, the gear eccentric sleeve 1 may be small in size and may not be manufactured as two parts as in the case of the bearing 10. For example, the positions where the blocks 4, 5 are installed may also be below the cylinder rather than above the piston pin 32. Since the blocks 4, 5 should be installed away from the crank arm, counterweight, and crank pin 34, these may be placed one by one close to each side of the connecting rods 11, 19, 20. It would suffice if the right rotation rack extension end 12 and the left rotation rack extension end 13 are also installed below, not above, the piston pin 32, and the ends of each of the extension ends 12, 13 protrude to the left and right to reach the left and right blocks 4, 5, respectively. As a result, the right rotation rack extension end 12 and the left rotation rack extension end 13 may move on paths that are shorter than the path 36 through which the right rotation rack extension end 12 is passed and the path 37 through which the left rotation rack extension end 13 is passed, respectively, as illustrated in FIG. 2. In addition, the position of the blocks 4, 5 is between the cylinder and the crankshaft 33, which may reduce use of the space.

Figure 5A:
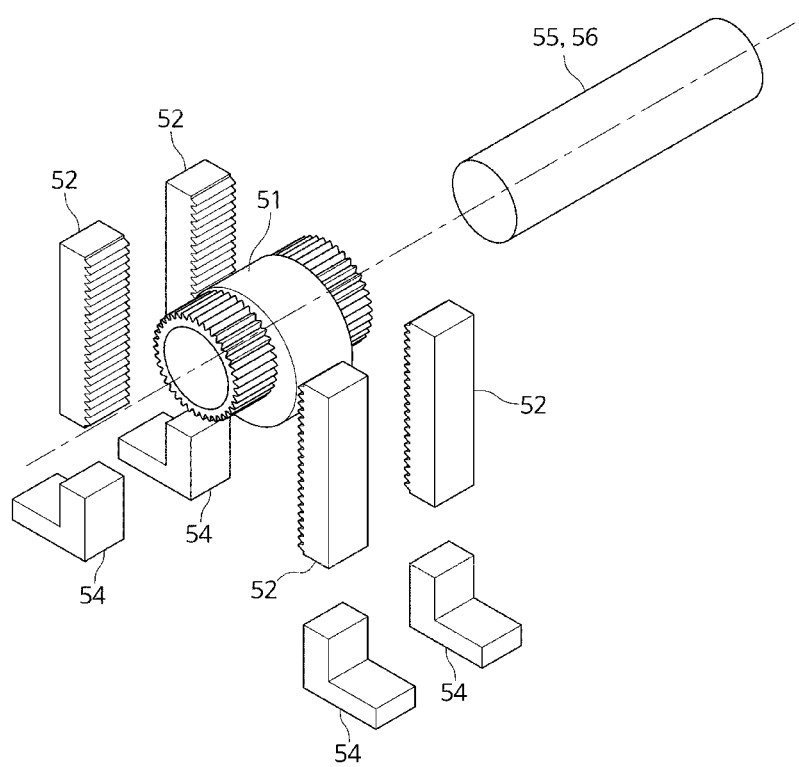
FIG. 5A is an exploded perspective view of a gear eccentric sleeve having a pinion gear formed on an outer circumferential surface of a concentric sleeve, a rack and a block according to an embodiment.

FIG. 5A is an exploded perspective view of a gear eccentric sleeve 51 having a pinion gear formed on an outer circumferential surface of a concentric sleeve, a rack 52, and a block 54 according to an embodiment. As illustrated, the gear eccentric sleeve 51, the rack 52 and the block 54 may be provided. The gear eccentric sleeve 51, the rack 52 and the block 54 may be used for the big end or small end of the connecting rod 60. Pins 55, 56 may be a piston pin 55 and/or a crank pin 56. According to an embodiment, the gear eccentric sleeve 51 may have concentric sleeves on both ends of the eccentric sleeve, and pinion gears formed on the outer circumferential surfaces of the concentric sleeves. Referring to FIGS. 1A to 1D, it is disclosed that the gear eccentric sleeve 1 is used for the big end of the connecting rod. On the other hand, the gear eccentric sleeve 51 illustrated in FIGS. 5A to 5C may be used for the small end and/or the big end of the connecting rod. When the gear eccentric sleeve 51, the rack 52 and the block 54 are used for the small end of the connecting rod, in a sequential order, the gear eccentric sleeve 51 may be installed to surround the piston pin 55, and then the small end of the connecting rod 60 may be installed to surround the gear eccentric sleeve 51.

Figure 5B:
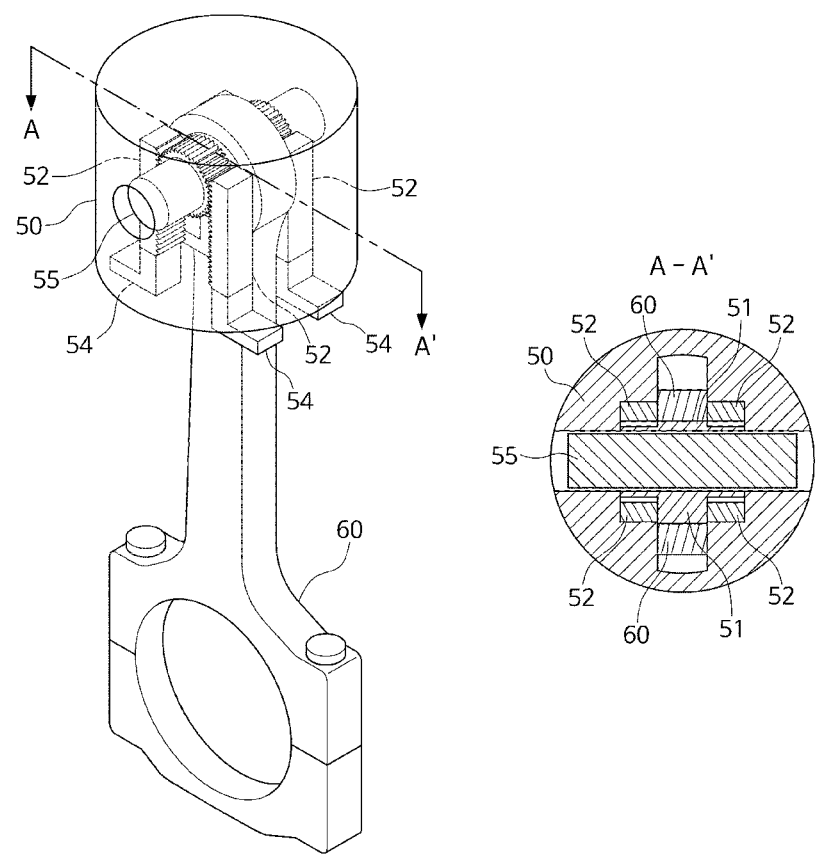
FIG. 5B is a cross-sectional view illustrating a state in which the structure of FIG. 5A is installed on the small end of the connecting rod according to an embodiment.

FIG. 5B is a cross-sectional view illustrating a state in which the structure of FIG. 5A is installed on the small end of the connecting rod 60 according to an embodiment. As illustrated, the small end of the connecting rod 60 may contact the eccentric sleeve portion at the center of the gear eccentric sleeve 51 and may not contact the concentric sleeve positioned at both ends of the eccentric sleeve. The rack 52 may be installed inside the piston 50. According to needs, two or four racks 52 may be installed on both ends of the piston pin 55. When the crankshaft is rotated, the racks 52 may be reciprocated up and down with the piston 50, respectively. The blocks 54 are installed adjacent to the lower ends of the racks 52, respectively, and when the piston 50 is near the bottom dead center through vertical position adjustment, the blocks contact the lower ends of the racks 52, respectively, pushing up the racks 52 to a required extent.

Figure 5C:
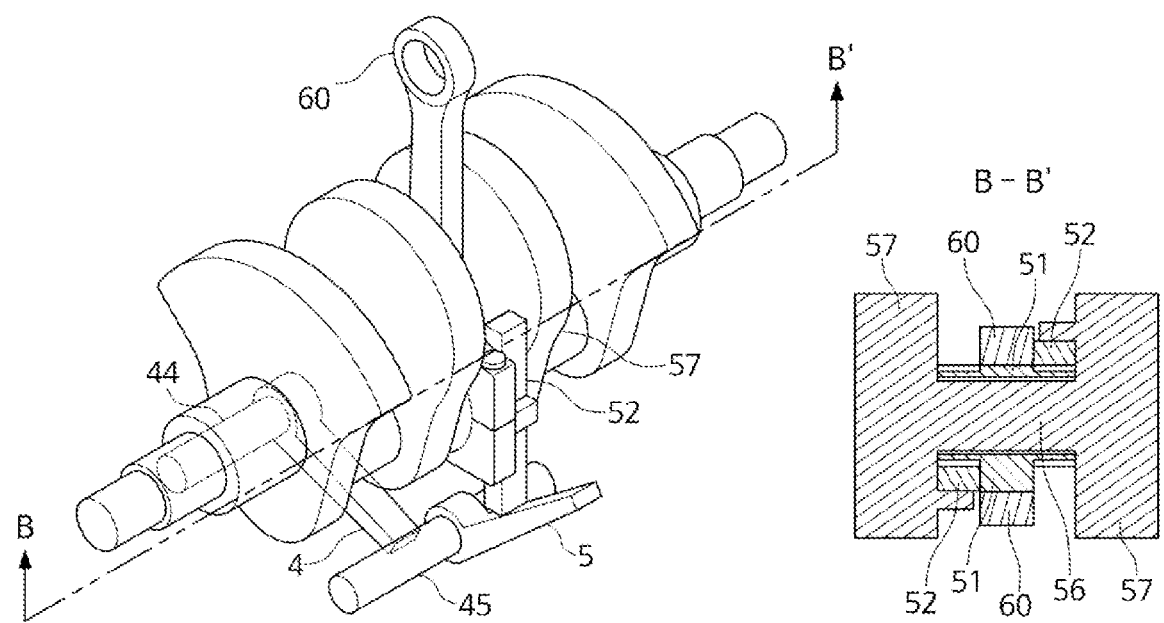
FIG. 5C is a cross-sectional view illustrating a state in which the structure of FIG. 5A is installed on the big end of the connecting rod according to an embodiment.

FIG. 5C is a cross-sectional view illustrating a state in which the structure of FIG. 5A is installed on the big end of the connecting rod 60 according to an embodiment. When used for the big end of the connecting rod 60, the gear eccentric sleeve 51 may be installed to surround a crank pin 56, and the big end of the connecting rod 60 may be installed to surround the gear eccentric sleeve 51. The gear eccentric sleeve 51 may be manufactured as two parts and then assembled, as in the case of the bearing 10.

The big end of the connecting rod 60 may contact the eccentric sleeve portion at the center of the gear eccentric sleeve 51 and may not contact the concentric sleeve portions at both ends thereof. Only two racks 52 and two blocks 54 in the diagonal direction may be provided. The installation location of each of the racks 52 may be on a side of a crank arm 57. The crank arms 57 may be positioned and installed on both ends of the crank pin 56, respectively. When the crankshaft is rotated, the two racks 52 and the crankshaft may be rotated around the crank arms 57. Referring to FIG. 2, being installed on the connecting rod 11, each of the racks 2, 3 is not likely to turn over while rotating, but the rack 52 illustrated in FIGS. 5A to 5C installed on the crank arm 57 may be turned over while rotating. Meanwhile, when the piston is near the bottom dead center, the ends of the two racks 52 may be moved along a path similar to the path 36 through which the right rotation rack extension end is passed and the path 37 through which the left rotation rack extension end is passed as illustrated in FIG. 2, respectively. Accordingly, the blocks 4, 5 may have a shape similar to the blocks 4, 5 of FIG. 2 and may push up the rack 52.

Figure 5D:
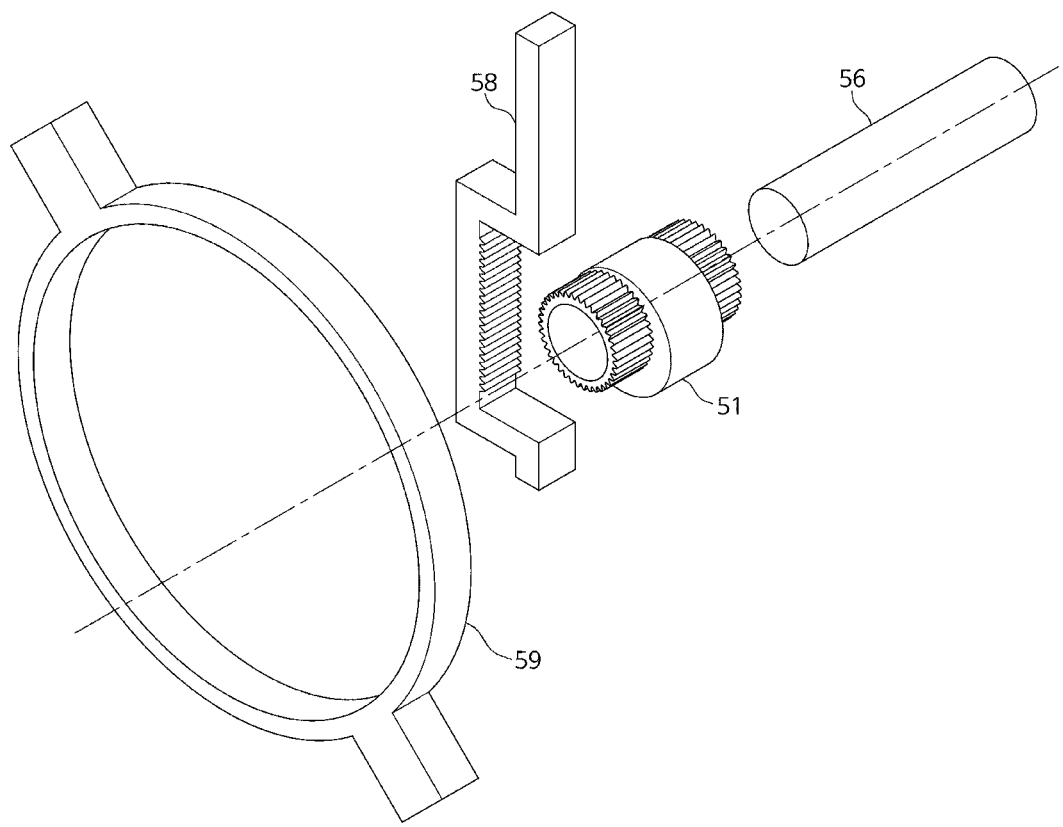
FIG. 5D is an exploded perspective view of a gear eccentric sleeve having a pinion gear formed on an outer circumferential surface of a concentric sleeve, a rack and a block according to another embodiment.

FIG. 5D is an exploded perspective view of a gear eccentric sleeve having a pinion gear formed on an outer circumferential surface of a concentric sleeve, a rack and a block according to another embodiment. Further, FIG. 5E is a cross-sectional view illustrating a state in which the structure of FIG. 5D is installed on the big end of the connecting rod according to another embodiment.

Figure 5E:
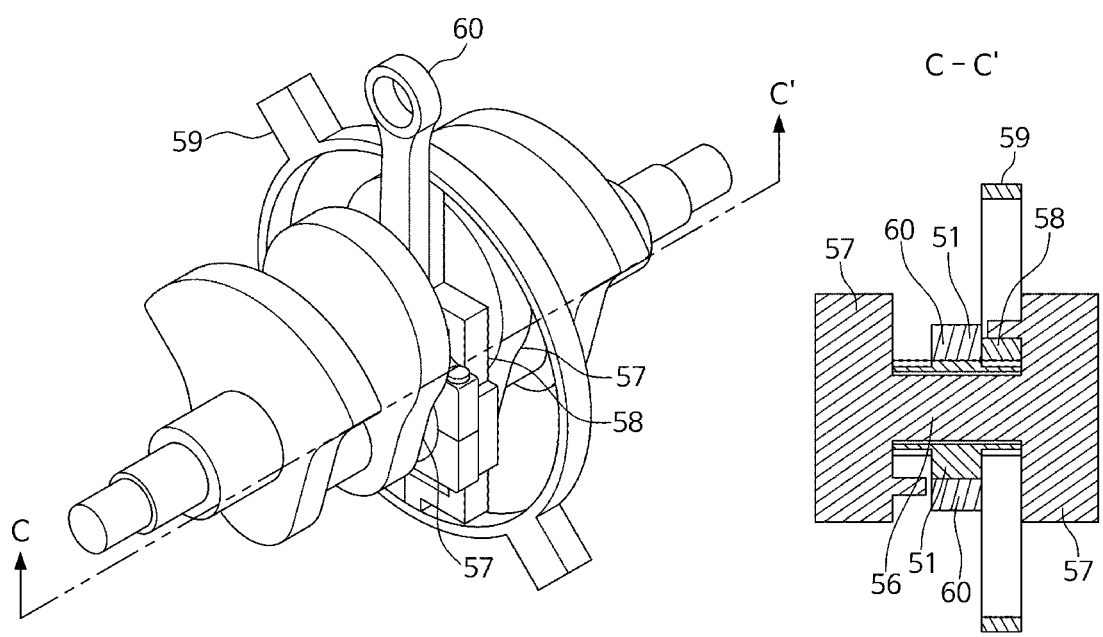
FIG. 5E is a cross-sectional view illustrating a state in which the structure of FIG. 5D is installed on the big end of the connecting rod according to another embodiment.

FIGS. 5D and 5E illustrate a variation of the structures of FIGS. 5A and 5C, in which a rack 58 and a block 59 are configured so that the block 59 is continuously in contact with the rack 58. Also, FIGS. 5D and 5E show that the rack 58 is installed at one side of the gear eccentric sleeve 51, but the present disclosure is not limited thereto. In another example, two racks having the same shape as the rack 58 may be installed at both sides of the gear eccentric sleeve 51.

Figure 6A:
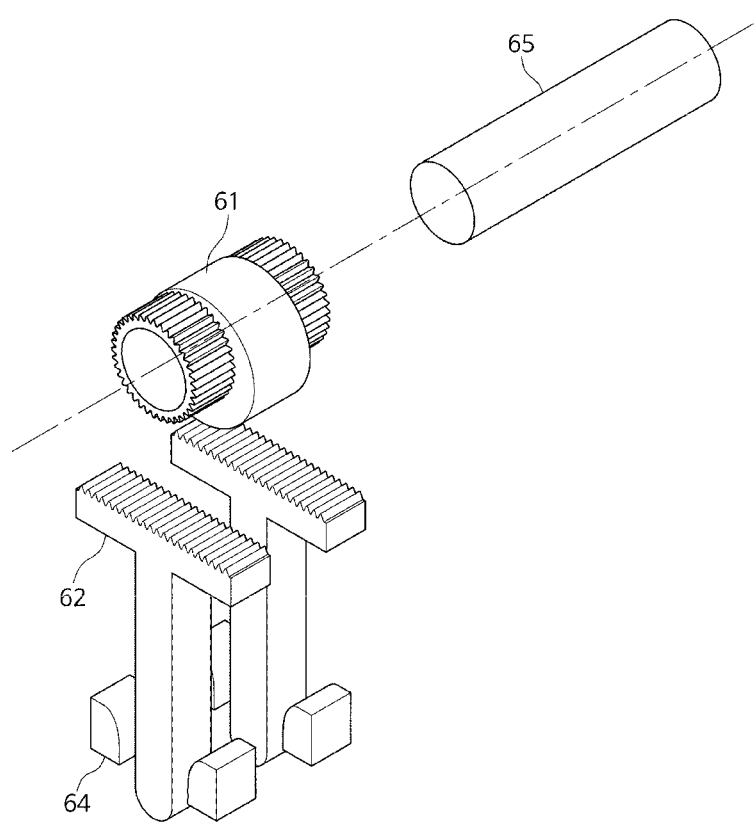
FIG. 6A is an exploded perspective view illustrating a gear eccentric sleeve having a pinion gear formed on an outer circumferential surface of a concentric sleeve, a rack and a block according to an embodiment.

FIG. 6A is an exploded perspective view illustrating a gear eccentric sleeve 51 having a pinion gear formed on an outer circumferential surface of a concentric sleeve, a rack 52, and a block 54 according to an embodiment. A small end of a connecting rod 60 may include the gear eccentric sleeve 61, the rack 62, the block 64, and a piston pin 65. As illustrated, the gear eccentric sleeve 61 may have concentric sleeves on both ends of the eccentric sleeve, and pinion gears formed on the outer circumferential surfaces of the concentric sleeves. The gear eccentric sleeve 61 may be installed to surround the piston pin 65, and the small end of the connecting rod 60 may be installed to surround the gear eccentric sleeve 61.

Figure 6B:
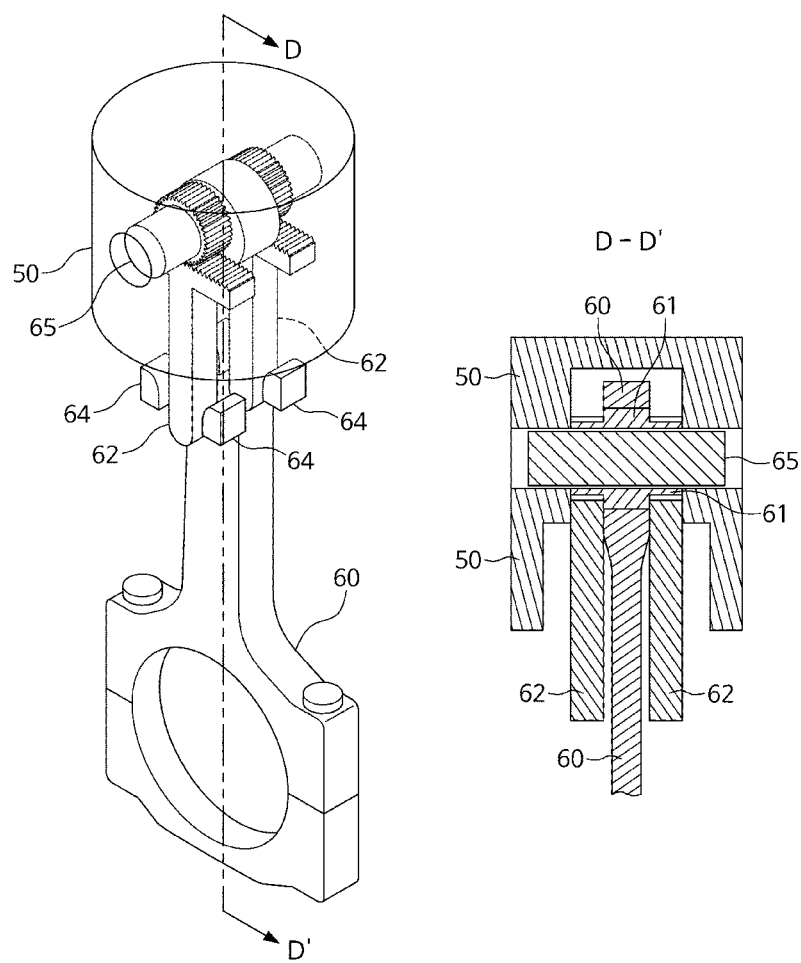
FIG. 6B is a vertical cross-sectional view illustrating an example in which the structure of FIG. 6A is installed on the piston pin according to an embodiment.

FIG. 6B is a vertical cross-sectional view illustrating an example in which the structure of FIG. 6A is installed on the piston pin 65 according to an embodiment. As illustrated, the small end portion of the connecting rod 60 may contact the eccentric sleeve portion at the center of the gear eccentric sleeve 61 and may not contact the concentric sleeve portion positioned at both ends. The installation location of the rack 62 may be inside the piston 50. According to needs, one or more racks 62 may be installed on both sides of the piston 50. When the crankshaft is rotated, the racks 62 may be reciprocated up and down together with the piston 50. The block 64 may be installed on the lower end of the rack 62 and move one or more racks 62 to the left and right through the left and right position adjustments, as necessary.

Figure 6C:
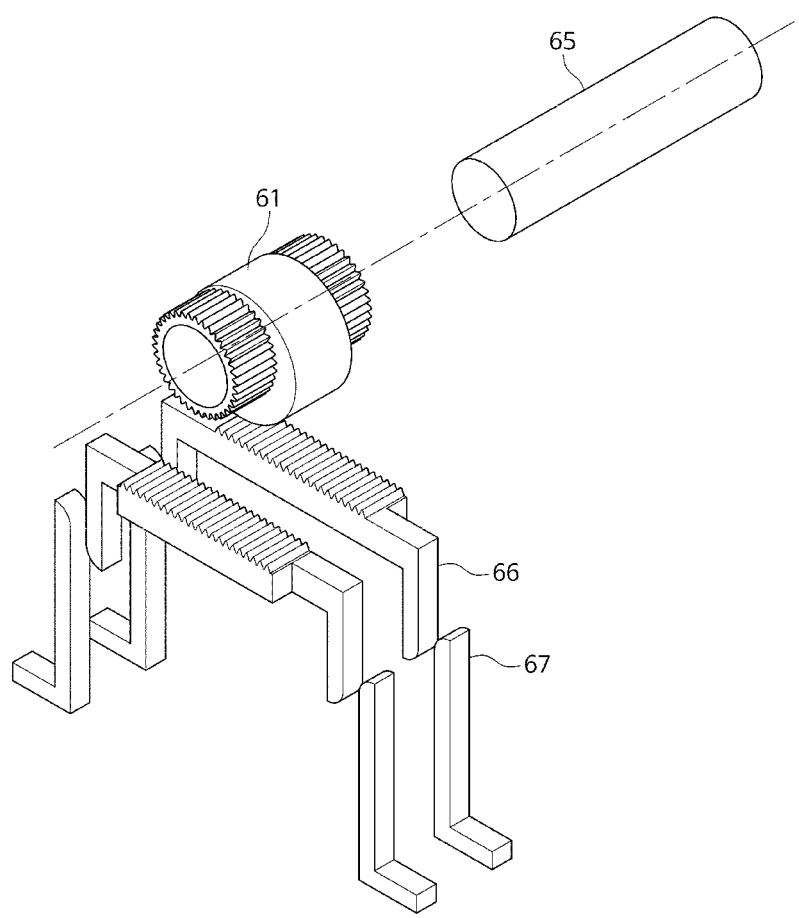
FIG. 6C is a view illustrating a rack and a block having a shape modified from the structure of FIG. 6A according to an embodiment.

FIG. 6C is a view illustrating a rack 66 and a block 67 having a shape modified from the structure of FIG. 6A according to an embodiment. The rack 66 and the block 67 illustrated in the drawing can reduce the weight of the piston, and the rack 66 may be less protruded out of the cylinder. Meanwhile, the rack 66 and the block 67 are not limited to those illustrated in FIG. 6C, and the rack 66 and block 67 may be provided in a variety of shapes.

When the gear eccentric sleeve 51 and the rack 52 illustrated in FIGS. 5A to 5C or the gear eccentric sleeve 61 and the rack 62 illustrated in FIGS. 6A to 6C are used for the small end of the connecting rod, a difference may occur according to how the gear eccentric sleeves 51, 61 are fixed. A method of fixing the gear eccentric sleeves 51, 61 so as to keep it from being moved easily at the small end of the connecting rod 60 may be used. Then, when the connecting rod 60 is moved up and down and shakes left and right, the gear eccentric sleeves 51, 61 are rotated to the left and right integrally with the connecting rod 60, and the piston pin may be the center on which the gear eccentric sleeves 51, 61 shake left and right. Thus, the piston can always receive a force from the center of the piston pins 55, 65. However, in the case of using the method of fixing the gear eccentric sleeves 51, 61 to keep it from moving easily in the piston 50, when the connecting rod 60 is moved up and down and shakes left and right, the gear eccentric sleeves 51, 61 may be integral with the piston and may not be rotated to the left and right. In addition, the small end of the connecting rod may be rotated in the eccentric sleeve portion which is in the center of the fixed gear eccentric sleeves 51, 61. The center of the eccentric sleeve in the center of the gear eccentric sleeves 51, 61 may not coincide with the center of the piston pins 55, 65. Thus, the piston 50 may not receive a force from the center of the piston pins 55, 65. In the case of using a method of fixing the gear eccentric sleeves 51, 61 so as to keep it from moving easily on the piston 50, the positions of the piston pins 55, 65 may need to be moved to a position off the center of the piston 50.

As a method of keeping the gear eccentric sleeves 51, 61 from easily moving on the small end of the connecting rod, the hole in the small end of the connecting rod may be made without a gap in the eccentric sleeve, or brake pads may be installed on the inner wall of the hole in the small end of the connecting rod. As a method of keeping the gear eccentric sleeves 51, 61 from easily moving on the piston, a method of fixing the racks 52, 62, such as, installing brake pads on the engaged racks 52, 62 or the like, may also be used.

Figure 7A:
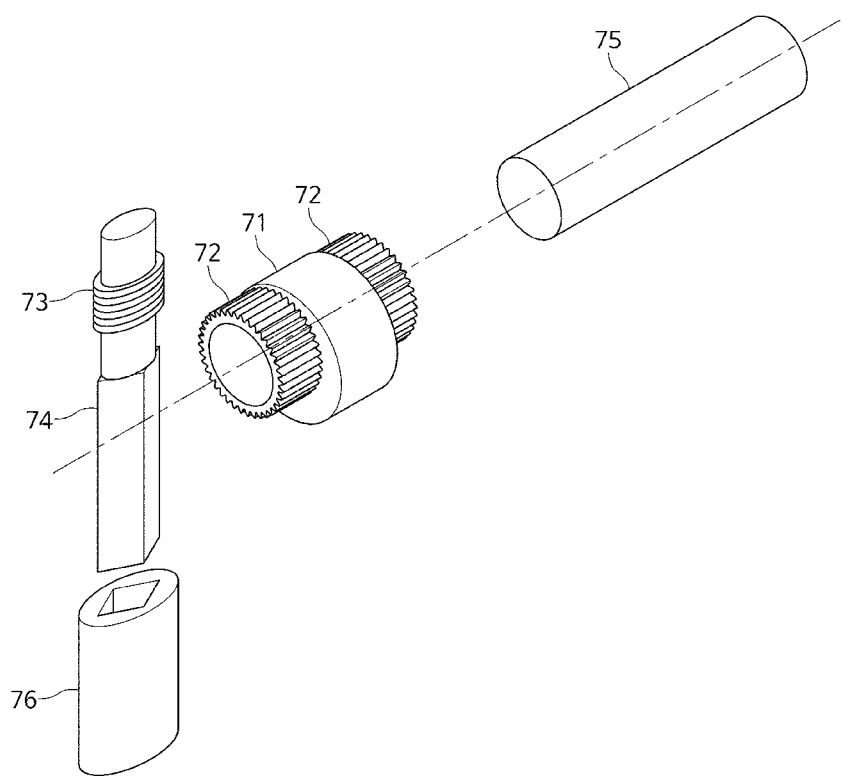
FIGS. 7A and 7B are exploded perspective views illustrating a worm wheel eccentric sleeve, a worm shaft equipped with worms, and a worm shaft rotation rod according to an embodiment.
Figure 7B:
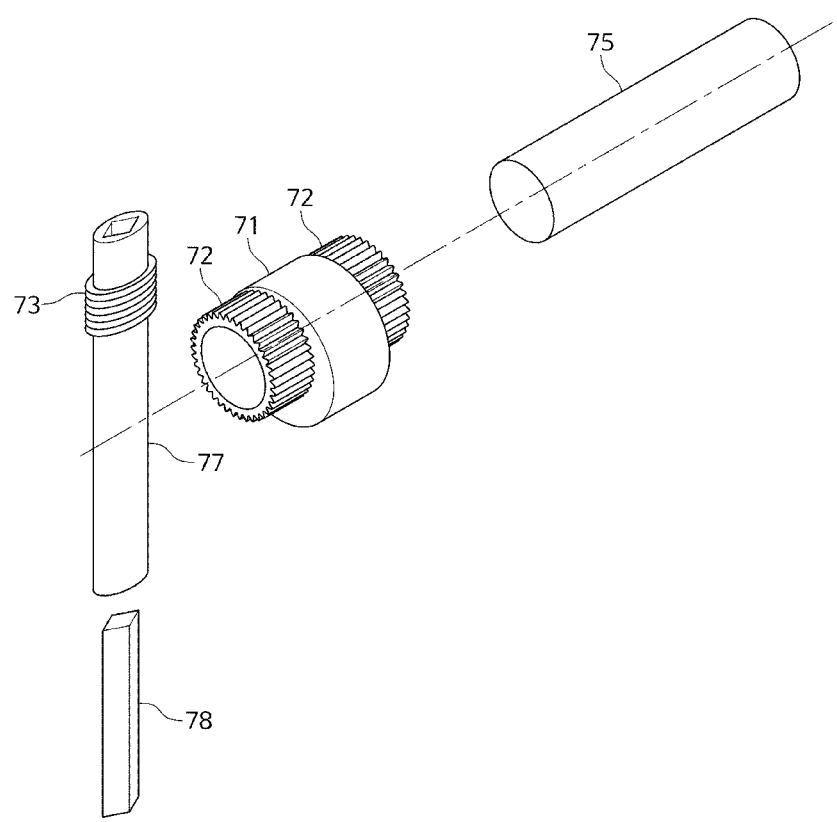

FIGS. 7A and 7B are exploded perspective views illustrating a worm wheel eccentric sleeve 71, a worm shaft 74 equipped with worms 73, and a worm shaft rotation rod 76 according to an embodiment. As illustrated, the worm wheel eccentric sleeve 71, the worm wheels 72, the worms 73, the worm shafts 74, 77, a piston pin 75 and worm shaft rotation rods 76, 78 may be included. According to an embodiment, the worms 73 may be used to rotate the worm wheels 72, and the posture of the worm wheel eccentric sleeve 71 may be determined according to the rotation of the worms 73 and the worm wheels 72. The worms 73 may be installed on the piston, and the worms 73 may be rotated by the worm shafts 74, 77 and the worm shaft rotation rods 76, 78. The worm wheel eccentric sleeve 71 may have concentric sleeves formed at both ends of the eccentric sleeve, and the worm wheels 72 formed on the outer circumferential surface of the concentric sleeve. The worm wheel eccentric sleeve 71 may be installed on the piston pin 75, and the worms 73 may be installed inside the piston. The small end of the connecting rod (not shown) may contact the eccentric sleeve portion at the center of the worm wheel eccentric sleeve 71 and may not contact the concentric sleeve portions on both sides.

The worm wheels 72 may be installed on one end or both ends of the worm wheel eccentric sleeve 71. The worm shaft may receive a rotation from the worm shaft rotation rod and may also be moved in the axial direction. When the worm wheels 72 are installed on both ends, the worms 73 may be engaged with the worm wheels 72, respectively. One or more worms 73 may be installed. The worms 73 may each have the worm shafts 74, 77, and the worm shafts 74, 77 may be installed on the piston. In addition, the worm shafts 74, 77 may be rotated by the worm shaft rotation rods 76, 78 positioned on the lower end of the worm shafts 74, 77. When the worms 73 are rotated, the worm wheels 72 may be rotated to rotate the worm wheel eccentric sleeve 71 to a certain extent, and change the posture of the worm wheel eccentric sleeve 71. As a result, the effective length of the connecting rod may be changed to change the top dead center of the piston, thereby changing the compression ratio. When the worms 73 are not rotated, the worm wheels 72 may not be rotated, and the posture of the worm wheel eccentric sleeve 71 may not be changed. The engine may continue to move with the changed compression ratio until the worm shaft rotation rods 76, 78 are rotated again.

Meanwhile, the worm shafts 74, 77 and the worm shaft rotation rods 76, 78 may be connected to each other in a slidable manner. In such a configuration, since the worm shafts 74, 77 are reciprocated together with the piston as shown in the two examples on both sides in FIGS. 7A and 7B, they can be moved while sliding into or out of the worm shaft rotation rods 76 and 78, although embodiments are not limited thereto. For example, a pentagraph structure may also be used. In order for the lower portions of the worm shafts 74, 77 and the worm shaft rotation rods 76, 78 to move slidably relative to each other, the lower portion of the worm shaft 74 may have a polygonal column shape or may have a spline gear formed on its outer circumferential surface. Conversely, the worm shaft rotation rod 78 may have a polygonal column shape or a spline gear shape to move through the worm shaft 77. However, in consideration of rapid reciprocating motion, it is preferred that rollers or bearings are also used while the polygonal structure is used, and that the worm shafts 74, 77 are preferably light-weighted.

When the worm shaft rotation rods 76, 78 are rotated, the worms 73 are rotated, and when the worms 73 are rotated, the worm wheels 72 are rotated, and when the worm wheels 72 are rotated, the worm wheel eccentric sleeve 71 may be rotated. The worm shaft rotation rods 76, 78 may be manipulated to control the worm wheel eccentric sleeve 71 and the posture of the worm wheel eccentric sleeve 71, thereby controlling the effective length of the connecting rod and controlling the compression ratio.

One of the important qualities of automobiles is the realization of fuel economy, performance, emission reduction, and the like, and the variable compression ratio engine is one of the essential elements to achieve this. The variable compression ratio engine according to the present disclosure can be implemented through small changes in the related engine, and thus can be used in various automobiles.

It should be understood that the embodiments of the present disclosure described above are disclosed for the purpose of illustration, and those skilled in the art with ordinary knowledge of the present disclosure will be able to make various modifications, changes and additions within the spirit and scope of the present disclosure, and such modifications, changes and additions are within the scope of the claims.

What is claimed is:

1. A variable compression ratio engine, comprising:
   a connecting rod including a first end connected to a piston through a piston pin, and a second end connected to a crankshaft through a crank pin;
   a gear eccentric sleeve installed on at least one of the piston pin and the crank pin;
   at least one rack engaged with a gear formed on an outer circumferential surface of the gear eccentric sleeve at one side thereof;
   a rack extension end protruding from one end of the rack; and
   at least one block configured to be spaced apart from the rack extension end and configured for adjusting a rotation angle of the gear eccentric sleeve by contacting the rack extension end and moving the rack extension end when the rack is moved as the crankshaft is rotated.

2. The variable compression ratio engine according to claim 1, further comprising:
   a brake pad having one side in contact with one side of the rack; and
   a spring contacting the other side of the brake pad and applying pressure to the brake pad to control a movement of the rack.

3. The variable compression ratio engine according to claim 1, wherein the rack is engaged with a gear of the gear eccentric sleeve in at least one of a vertical direction, a horizontal direction, or an inclined direction with respect to a longitudinal direction of the connecting rod.

4. A variable compression ratio engine, comprising:
   a connecting rod including a first end connected to a piston through a piston pin, and a second end connected to a crankshaft through a crank pin;
   a gear eccentric sleeve including a cylindrical eccentric sleeve installed on at least one of the piston pin or the crank pin, and a cylindrical concentric sleeve positioned on both ends or on one end of the eccentric sleeve and including a pinion gear formed on an outer circumferential surface thereof;
   at least one rack engaging with a gear formed on the outer circumferential surface of the gear eccentric sleeve; and
   at least one block configured to be spaced apart from one end of the rack and configured for adjusting a rotation angle of the gear eccentric sleeve by contacting the rack and moving the rack.

5. The variable compression ratio engine according to claim 4, wherein the rack is configured to be continuously in contact with the block.

* * * * *